United States Patent
Moritz et al.

(10) Patent No.: US 11,408,483 B2
(45) Date of Patent: Aug. 9, 2022

(54) LINE GUIDING DEVICE

(71) Applicant: igus GmbH, Cologne (DE)

(72) Inventors: Simon Moritz, Cologne (DE); Harald Nehring, Bonn (DE)

(73) Assignee: IGUS GMBH, Cologne (DE)

( * ) Notice: Subject to any disclaimer, the term of this patent is extended or adjusted under 35 U.S.C. 154(b) by 760 days.

(21) Appl. No.: 16/329,978

(22) PCT Filed: Aug. 30, 2017

(86) PCT No.: PCT/EP2017/071689
§ 371 (c)(1),
(2) Date: Mar. 1, 2019

(87) PCT Pub. No.: WO2018/041852
PCT Pub. Date: Mar. 8, 2018

(65) Prior Publication Data
US 2019/0195316 A1    Jun. 27, 2019

(30) Foreign Application Priority Data
Sep. 1, 2016  (DE) .................... 20 2016 104 838.9

(51) Int. Cl.
*F16G 13/16* (2006.01)
*H02G 3/04* (2006.01)
(Continued)

(52) U.S. Cl.
CPC .......... *F16G 13/16* (2013.01); *H02G 3/0475* (2013.01); *H02G 11/006* (2013.01); *H02G 11/02* (2013.01)

(58) Field of Classification Search
CPC .... H02G 11/00; H02G 11/006; H02G 3/0475; F16G 13/16
See application file for complete search history.

(56) References Cited

U.S. PATENT DOCUMENTS 6,481,195 B1 * 11/2002 Blase .................. H02G 11/006
                                                    59/78.1
7,552,581 B1 * 6/2009 Pfeifer .................... F16G 13/16
                                                    59/78.1
(Continued)

FOREIGN PATENT DOCUMENTS

AU      2011100502      6/2011
CN      1831369         9/2006
(Continued)

OTHER PUBLICATIONS

Office Action from related Chinese Appln. No. 201780053894.2 dated Apr. 14, 2020. English translation of the search report attached.
(Continued)

*Primary Examiner* — Hoag C Nguyen
*Assistant Examiner* — Amol H Patel
(74) *Attorney, Agent, or Firm* — Grossman, Tucker, Perreault & Pfleger, PLLC (57) ABSTRACT

In a line guiding device for receiving and guiding energy lines, which can be arranged to form at least one loop which includes two runs and a connecting region connecting same, there is provided a device which causes a restoring force to be produced in the spread-open state of the runs in which the connecting region is bent open, the runs being moved back into their folded-together position by the restoring force.

17 Claims, 6 Drawing Sheets

(51) Int. Cl.
*H02G 11/00* (2006.01)
*H02G 11/02* (2006.01)

(56) References Cited

U.S. PATENT DOCUMENTS

| | | | |
|---|---|---|---|
| 8,806,847 B2 | 8/2014 | Blase et al. | |
| 2005/0274850 A1* | 12/2005 | Blase | F16G 13/16 248/65 |
| 2010/0058728 A1* | 3/2010 | Pfeifer | H05K 7/1491 59/78.1 |
| 2012/0311990 A1* | 12/2012 | Dunham | H02G 11/006 59/93 |

FOREIGN PATENT DOCUMENTS

| | | |
|---|---|---|
| CN | 101680510 | 3/2010 |
| CN | 102141115 | 8/2011 |
| CN | 202790326 | 3/2013 |
| CN | 103502687 | 1/2014 |
| CN | 204407844 | 6/2015 |
| DE | 8124929 | 3/1982 |
| DE | 29806969 | 7/1998 |
| DE | 29820117 | 3/1999 |
| DE | 102012110967 | 5/2013 |
| DE | 102015101719 | 8/2016 |
| WO | 2005/098267 | 10/2005 |

OTHER PUBLICATIONS

Office Action from related Chinese Appln. No 201780063284.0, dated Apr. 3, 2020. English translation of the search report attached.
English translation of International Search Report from corresponding PCT Appln No. PCT/EP2017/071689, dated Dec. 20, 2017.
English translation of International Preliminary Report on Patentability from corresponding PCT Appln No. PCT/EP2017/071689, dated Dec. 12, 2018.

* cited by examiner

LINE GUIDING DEVICE

FIELD

The invention concerns a line guiding device for receiving and guiding energy lines between a connecting member which can be arranged stationarily and a movable connecting member, which device can be arranged to form at least one loop, wherein the loop has a first run which is closer to the connecting member which can be arranged stationarily over the course of the line guiding device and a second run which is more remote in relation to the connecting member which can be arranged stationarily over the course of the line guiding device, which runs are connected together by an arcuate connecting region, wherein the runs and the connecting region have a space which is continuous between the two connecting members for receiving the energy lines and the connecting region is bendable at least in the plane in which the runs are arranged over a spread angle (>0°).

BACKGROUND

Line guiding devices of that kind serve to guide energy lines like for example electric lines, fiber optics and hydraulic hoses and/or data from a relatively stationary source to a consumer upon the movements thereof in controlled fashion. They are used in particular in mechanical engineering in all possible production, processing and conveyor apparatuses and installations.

In general, the area of action of a consumer is limited with a line guiding device of the kind set forth in the opening part of this specification, as controlled guidance of energy lines permits only certain movement patterns on the part of the consumer. In the case of greater areas of action guide devices are required for the line guiding device for the controlled pattern of movement and in most cases a plurality of successively connected line guiding devices with such guide devices, whereby the area of action is also limited. In particular in the case of larger areas of action in which the consumer can substantially freely move controlled guidance of the energy lines upon movement of the movable connecting member towards the stationarily arranged connecting member represents a problem.

That problem arises in particular in highly complicated production and processing processes like for example spray painting of larger items of complex shape like aircraft. Spray painting is generally effected in gantry halls in which gantries or platforms from which the spray painting operation is performed are movable both vertically and also horizontally by indoor cranes. A plurality of successively connected line guiding devices which follow individual movement patterns in controlled fashion supply the gantry or the platform with energy.

If instead of a gantry crane a working platform which is self-propelled on the floor of the hall is to be used, from which the painting operation can be carried out and which must have a large area of action, this involves the problem of a suitable line guiding device which controls the working platform and which can follow over that large area of action free from obstacles like guide devices and intermediate stations.

SUMMARY

The object of the present invention is generally to provide a line guiding device which permits a free movement of the movable connecting member and thus the consumer over a greater area of action and both when its movable connecting member moves away from the connecting member which can be arranged stationarily and also when the movable connecting member approaches the connecting member which can be arranged stationarily, and permits better controlled movement of the line guiding device extending between the connecting members.

According to the invention in a line guiding device of the kind set forth in the opening part of this specification that object is attained in that the connecting region is so designed or there is provided a device which causes a restoring force to be produced in the spread-open state of the runs, by bending open the connecting region, the runs being moved back into their folded-together position by the restoring force.

By virtue of the restoring force afforded by the measures involved the line guiding device is pulled together in controlled fashion in the region of its at least one loop when the movable connecting member is moved towards the connecting member which can be arranged stationarily, into its possible starting position. By virtue of a suitable setting for the restoring force, the movable connecting member can be moved out of its possible starting position from the connecting member which can be arranged stationarily, over a given area of action of the consumer, wherein the line guiding device disposed between the two connecting members can also be moved in controlled fashion by the runs being folded or spread open.

In order to move the line guiding device controlledly over a larger area of action of the consumer there can be provided a plurality of loops which adjoin each other in an S-shape and which extend alternately and the runs of which according to the invention can be spread open, wherein the end of a first loop, that is opposite to the connecting region, is connected to the connecting member which can be arranged stationarily, and the end of a n-th (n>1) loop, that is opposite to the connecting region, is connected to the movable connecting member.

In the case of the loops which adjoin each other in an S-shape and which extend alternately and which are arranged in a meander configuration, immediately mutually adjoining loops have a common run.

The spread angle, over which the runs of a loop can be pivoted open upon displacement of the line guiding device by virtue of the flexible connecting region, can be limited by limiting means. In particular the spread angle can be <180°, preferably <160°.

The connecting region can be in the form of an elastic tubular portion which is shaped in one piece and in an arcuate configuration.

The connecting region can have members which are pivotable relative to each other in at least one plane and which can be hingedly connected together in one piece or can be in the form of separate members with hinge joint connections.

The restoring force when spreading open the two runs of a loop can be produced by the provision of an elastic element which engages both runs and which, upon spreading of the runs from an arrangement of the runs that is substantially parallel or an arrangement that contacts the ends remote from the connecting region, exerts a restoring force on the runs.

The elastic element can engage end regions of the runs of a loop, that directly adjoin the connecting region. Deformation of the elastic element when the runs are spread apart over a great spread angle can in this case be kept relatively slight.

In particular the elastic element can be arranged between the two runs of a loop.

In the case of the runs of a loop being arranged substantially parallel the elastic element can extend at an angle between 0° and 45° with respect to the runs.

The elastic element can have at least one elastic band engaging opposite sides of the runs of a loop.

The restoring force when the runs of a loop are spread open can also be produced by the loop having a restoring actuator which is controlledly actuatable.

A control device which is arranged stationarily relative to the movable connecting member and which for example is actuable on the consumer can serve that purpose. The control device however can also be arranged independently of the movable connecting member and the movement thereof.

The control device can have a contact means which delivers a signal to the restoring actuator for controlled actuation thereof upon closure of the contacts. In particular the control device can be in signal communication with all loops of the line guiding device.

The restoring actuator of a loop or the restoring actuators of some or all loops of the line guiding device can be actuated when the movable connecting member connected to the consumer is to be moved back from an extended position in the area of actuation thereof. The line guiding device can then be laid together in a partially folded-together or entirely folded-together state which defines the starting position of the movable connecting member.

The runs of a loop can form substantially rigid regions of the line guiding device which do not substantially bend in the movement of the movable connecting member and the movement which occurs therewith of the line guiding device. The rigid regions can be connected to the connecting region in one piece by way of joint connections or can be connected to the connecting region by joint mountings separately from the connecting region.

The runs can have members in the manner of the members of the connecting region.

Pivotability of the members forming the runs can be blocked by abutments.

In particular the line guiding device can be in the form overall or in part of an energy guiding chain, the members of which respectively have two oppositely disposed side portions which, in at least some of the members, are connected together by transverse limbs, wherein adjoining side portions of directly adjacent members have joint connections. The members can be in the form of separate components or can have joint connections for hinged connection thereof. The joint connections can be arranged in the overlap region of mutually adjoining side portions.

The chain link members can be of a cranked configuration with regions which are cranked outwardly (away from the chain interior) and cranked inwardly (towards the chain interior). In that case the outwardly cranked region of a side plate bears against the inwardly cranked region of an adjoining side plate in the overlap regions thereof.

The side portions of the chain link members can alternatively be in the form of inner and outer plates which are arranged alternately in the lines of side portions of the energy guiding chain. The inward sides of the outer plates bear against the outward sides of the inner plates in the overlap regions of the plates.

The side plates of such energy guiding chains which can be used as line guiding devices according to the invention can have abutments which block pivotal movement of mutually adjoining side portions beyond their substantially straight position. In the opposite direction of pivotal movement abutments can limit the angular deflection of mutually adjoining side portions and define the radius of the arcuate connecting region.

Rigid regions of the run of a loop can be achieved in that, starting from an energy guiding chain as described hereinbefore with cropped side portions, which have doubled abutments in their overlap regions, each second side portion is connected, turned through 180° about its central transverse axis, to the adjacent side portions which are not turned round.

The doubled abutments in this arrangement counteract angular deflection of the side portions in both directions. In the case of a chain alternately consisting of inner and outer plates, with also doubled abutments in the overlap regions, rigid regions of the chain can also be implemented by turning round the inner plates or outer plates.

Rigid regions of the runs of a loop can also be achieved, even if not in such a stable fashion, by respective laterally oppositely disposed side portions of a pair of mutually adjoining chain link members being angled in opposite relationship to each other. Thus for example in the case of a chain whose link members alternately consist of inner and outer plates, rigid chains or chain portions can be achieved by turning round for example the inner plates in the case of a chain with cropped side portions by turning round each second side plate in the case of a line of plates which are in laterally opposite relationship of the chain, in respect of side portions which are laterally opposite to each other and which can be angled in opposite relationship to each other and thus in their straight position. Such chain portions can form the runs of a loop in a line guiding device according to the invention.

In that respect the connecting region of a loop can comprise the same chain link members as the two runs, insofar as it forms a portion of the line guiding device, in which the laterally opposite side portions are so arranged that they can be angled in the same direction relative to each other.

Instead of a structure which leads to rigid runs at a loop a line guiding device according to the invention can also be of such a configuration that the members of the run of a loop, that is more remote from the connecting member which can be arranged stationarily, have abutments which block pivotal movement of adjacent members of that run out of a straight arrangement outwardly, that is to say away from the opposite run of the loop, but permit pivotal movement of the members from the straight position inwardly, that is to say towards the opposite run. That structure to some extent also permits the runs to be controlledly spread apart and folded together upon displacement of the movable connecting member over a larger area of action.

In the above-described configuration of an energy guiding chain the side portions of the link members of the run of a loop, that is more remote from the connecting member which can be arranged stationarily, can be so oriented that they block a pivotal movement of adjacent members of that run outwardly out of the straight arrangement while the side portions of the run of the loop, that is more remote from the connecting member which can be arranged stationarily, are so oriented that they permit a pivotal movement of adjacent members of that run inwardly out of the straight position.

In the case of a line guiding device according to the invention which is in the form of an energy guiding chain and in which there is provided an elastic element engaging both runs of a loop the elastic element can engage oppositely disposed transverse limbs of the runs or narrow sides of the side portions of the chain link members.

At the oppositely disposed transverse limbs or narrow sides of the side portions at which the elastic element engages it is possible to arrange engagement suspension means in which an endless elastic band of the elastic element can be engaged.

The engagement suspension means can be integrally shaped to the transverse limbs in question or narrow sides of the side portions or can be releasably fixed thereto.

The elastic band can also be fixed in a simple manner by cable ties to the transverse limbs themselves or the holding devices on the transverse limbs or side portions.

According to the invention the line guiding device can be used in particular on the surface of a base on which it can be slidingly guided. The surface of the base then forms the area of action, over which the movable connecting member connected to the consumer can be moved. In that case the runs and the connecting region of a loop bear substantially with a side against the surface of the base.

The connecting member of the line guiding device, that can be arranged stationarily, can be arranged at the edge of the surface of the base, preferably in such a way that the movable connecting member can reach a region that is as large as possible of the surface (the area of action).

In the case of a line guiding device in the form of an energy guiding chain with box-shaped members having side portions the chain link members bear laterally with the side portions of one of the two oppositely disposed lines of side plates against the surface of the base and are guided slidingly on that surface.

In general, the line guiding device, upon movement of the movable connecting member from a starting point with folded-together runs of a loop towards any point which can be reached on the surface, with the runs of a loop being spread apart, and upon movement of the movable connecting member back to the starting point with the runs being folded together, is guided slidingly on the surface of the base.

The connecting member of the line guiding device, that can be arranged stationarily, can be fixed on the base and pivotably connected by way of a hinged connection to the adjoining run of a loop.

BRIEF DESCRIPTION OF THE DRAWINGS

Some embodiments of the line guiding device according to the invention are described in greater detail hereinafter with reference to the drawing. In the drawing:

FIG. 7a shows a line guiding device bearing laterally on the surface of a base, in which the movable connecting member has reached an edge region of the surface and is connected to a control device which is connected in signal-conducting relationship to restoring actuators in the connecting regions of the runs, and FIG. 7b shows an enlarged view of the region X in FIG. 7a.

DETAILED DESCRIPTION

Figure 1:
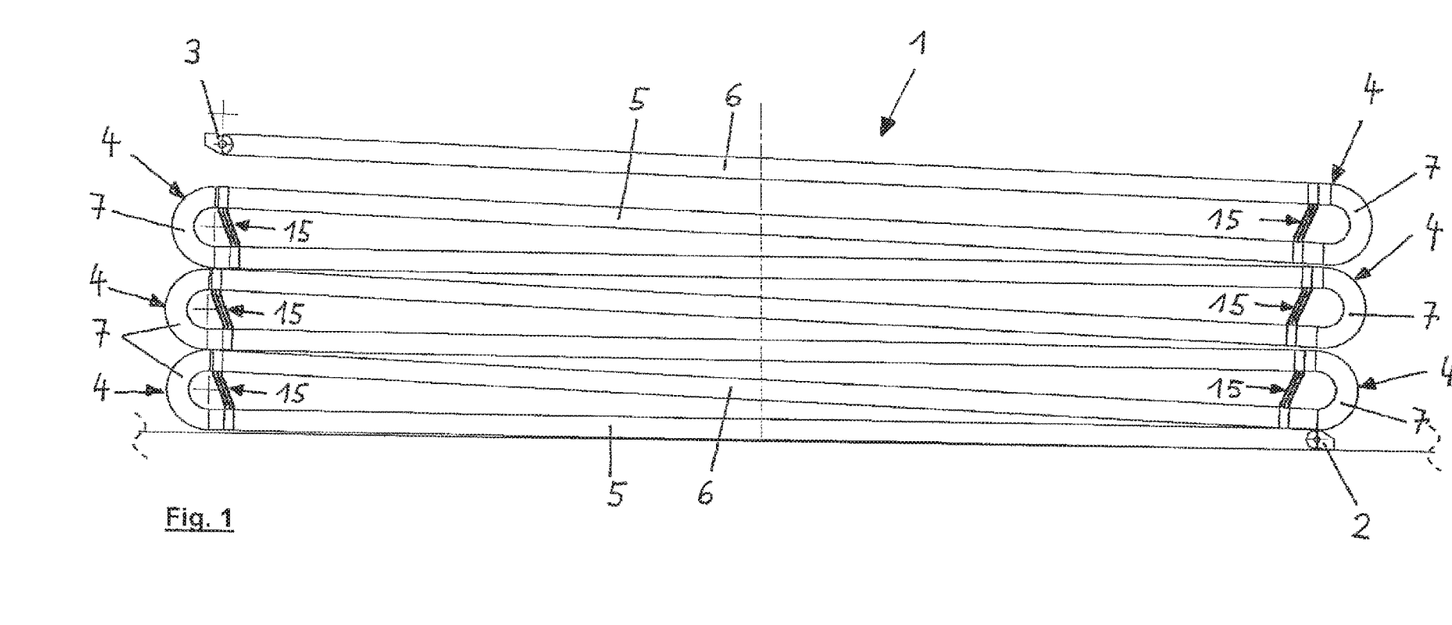
FIG. 1 shows a line guiding device comprising six loops in the folded-together state.

As can be seen from FIG. 1 the line guiding device 1 has a connecting member 2 which can be arranged stationarily and a movable connecting member 3. Extending between those connecting members is the line guiding device 1 in a folded-together (laid-together) state in a meander configuration in the form of a plurality of alternately extending loops 4 which adjoin each other in an S-shaped configuration. The loops 4 have a first run 5 which is closer to the connecting member 2 which can be arranged stationarily over the course of the line guiding device 1 and a second run 6 which is remote from the connecting member which can be arranged stationarily, over the course of the line guiding device 1. The runs 5 and 6 are connected together by an arcuate connecting region 7.

For receiving and guiding energy lines (not shown) between the connecting members 2 and 3 the runs 5 and 6 of the connecting region 7 have a space which is continuous between the two connecting members 2 and 3.

The connecting region 7 is bendable over a spread angle (>0°) in the plane in which the runs 5 and 6 are arranged.

In order to move the line guiding device 1 controlledly upon displacement of the movable connecting member 3 the connecting region 7 is of such a configuration or there is provided a device which provides that a restoring force is produced in the spread-open state of the runs 5 and 6 by bending open the connecting region 7, wherein the runs 5 and 6 are moved back into their folded-together (laid-together) position by the restoring force.

The end of a first loop, that is opposite to the connecting region, is connected to the connecting member 2 which can be arranged stationarily and the end of the sixth loop, that is opposite to the connecting region 7, is connected to the movable connecting member 3.

The connecting member 2 which can be arranged stationarily is connected pivotably to the adjoining run 5.

Figure 2:
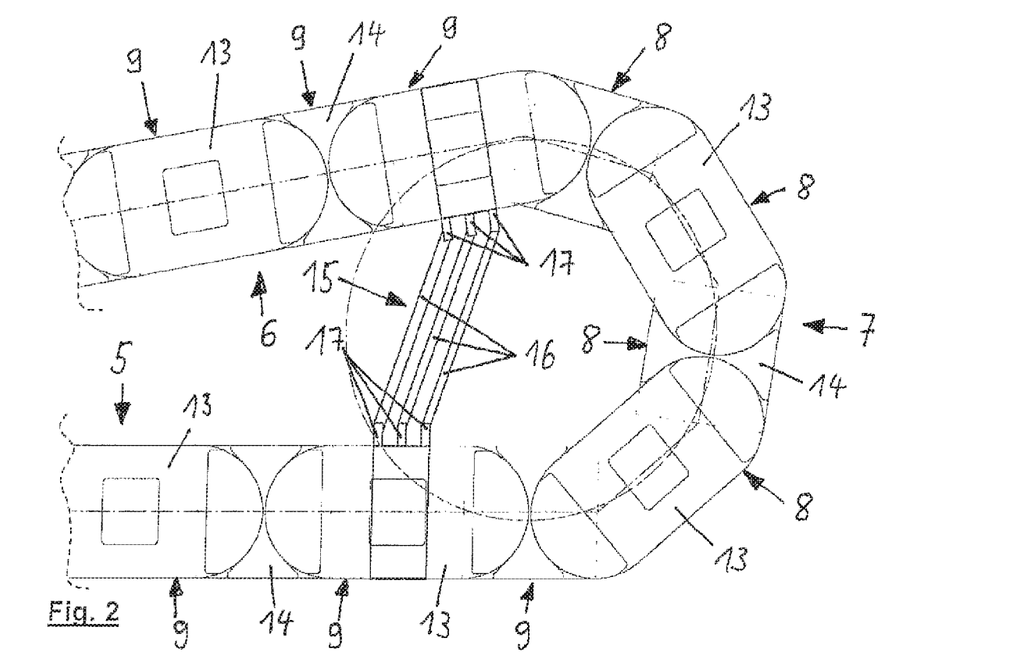
FIG. 2 shows a first embodiment by means of an enlarged view of the connecting region and adjoining regions of the runs.

In the plane in which the runs 5 and 6 are arranged the connecting region 7 has members 8 which are pivotable relative to each other and which are in the form of separate members 8 with hinge joint connections. As shown in FIG. 2 the runs 5 and 6 also have members in the manner of the members 8 of the connecting region.

While the members 8 of the connecting region 7 and the immediately adjacent members 9 of the runs 5 and 6 can be angled over a given angle in the bending direction of the connecting region 7 the members 9 of the runs 5 and 6 in the straight position shown in FIG. 2 are blocked against angulation in both pivotal directions. Upon the connecting region 7 being bent open the members 9 are pivoted in the direction towards their straight position as far as a maximum pivotal angle between their longitudinal directions. The maximum angle is <180°, for example 160°.

Overall the line guiding device 1 is in the form of an energy guiding chain, the link members 8 and 9 of which respectively have two oppositely disposed side portions 10 and 11 (FIGS. 4b and 5b) connected together by transverse limbs 12. As can be seen from FIG. 2 the side portions are formed from alternately arranged outer plates 13 and inner plates 14 which are diagrammatically shown in the Figures. The inward sides of the outer plates 13 bear against the outward sides of the inner plates 14 in the overlap regions thereof and are pivotably mounted in those overlap regions by hinge joint connections (not shown). The side portions 10 and 11 which are not shown in the drawing have doubled abutments which block pivotal movement of mutually adjoining side portions beyond their substantially straight position. In the opposite pivotal direction the doubled abutments limit the angular deflection of mutually adjoining side portions 10 and 11 and thus define the radius of the arcuate connecting region 7.

While the side portions 10 and 11 of the members 8 of the connecting region and the immediately adjoining members 9 of the runs 5 and 6 are pivotable in the above-mentioned fashion a rigid arrangement for the runs 5 and 6 is achieved by the side portions 10 and 11 of each second member 9 being turned through 180° about the central transverse axis, with respect to the arrangement thereof in the connecting region 7. In that position the doubled abutments block pivotal movement of the side portions 10 and 11 of the members 9 in both directions.

In the embodiment shown in FIG. 2 the restoring force upon spreading of the two runs 5 and 6 of a loop is produced by the provision of an elastic element 15 which engages both runs 5 and 6 and which, upon spreading of the runs 5 and 6 out of the substantially parallel arrangement shown in FIGS. 1 and 2, exerts a restoring force on the runs 5 and 6. The elastic element 15 has three elastic bands 16 which are fixed to holding devices 17 at mutually opposite sides of the members 9 of the runs, that adjoin the connecting region 7.

Figure 3:
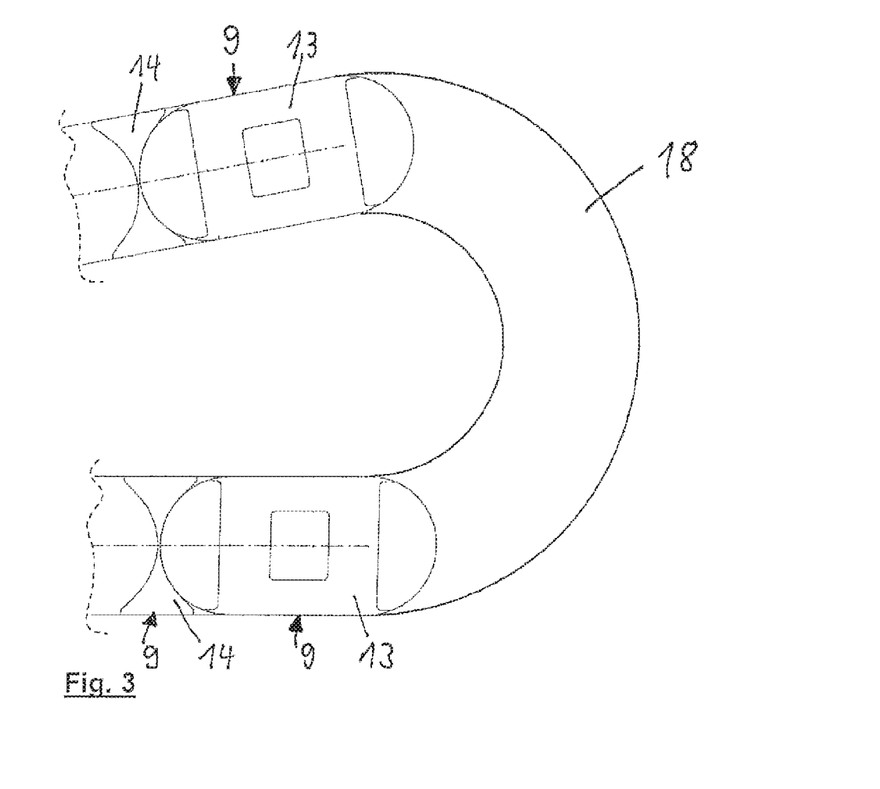
FIG. 3 shows a second embodiment by means of an enlarged view of the connecting region and adjoining regions of the runs.

In the embodiment shown in FIG. 3 the connecting region 7 is in the form of an elastic tubular portion 18 which is shaped in one piece and in an arcuate configuration.

Figure 4A:
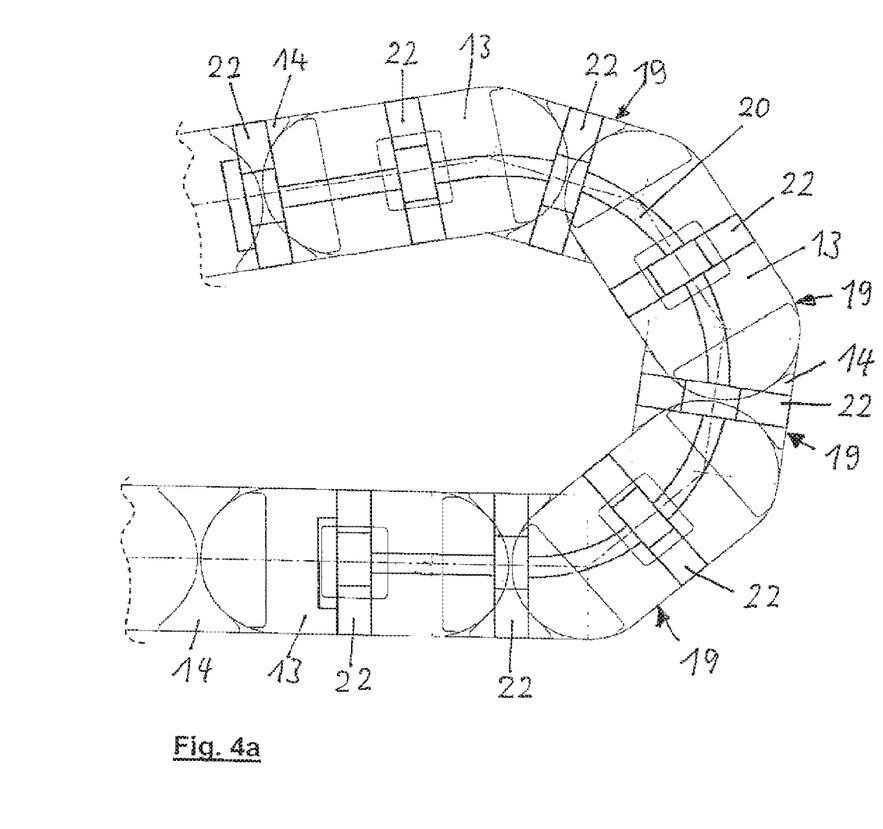
FIG. 4a shows a fourth embodiment by means of an enlarged view of the connecting region and adjoining regions of the runs.
Figure 4B:
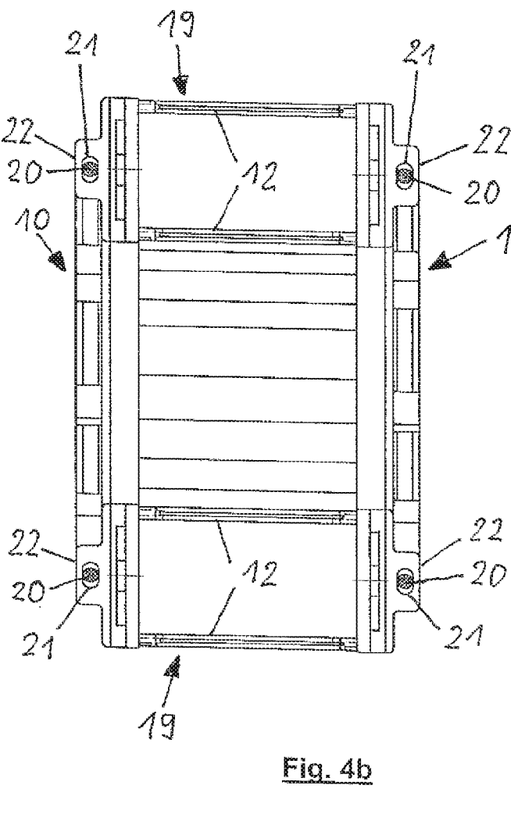
FIG. 4b shows an end view from the runs into the connecting region shown in FIG. 4.

In the embodiment shown in FIGS. 4a and 4b the connecting region has pivotably arranged members 19 in the manner of the members 8 described with reference to FIG. 2. Here the restoring force upon spreading of the two runs 5 and 6 is produced by elastic bars 20 which are arranged outwardly on the members 19 of the connecting region 7 and the adjoining members of the runs 5 and 6 and which are arcuate in the unstressed state. The bars 20 are guided through openings 21 in lateral projections 22 on the side portions 10 and are fixed to a projection 22 of the respective second side portion 10 and 11 adjoining the connecting region 7.

Figure 5A:
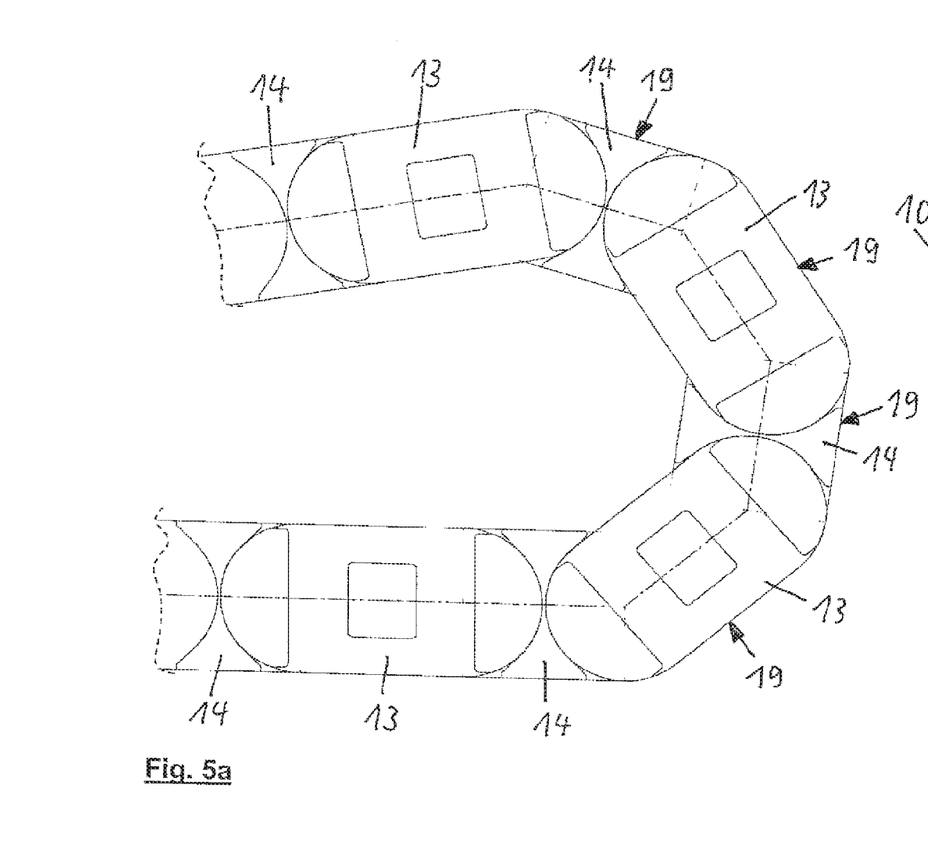
FIG. 5a shows a fourth embodiment by means of an enlarged view of the connecting region and adjoining regions of the runs.
Figure 5B:
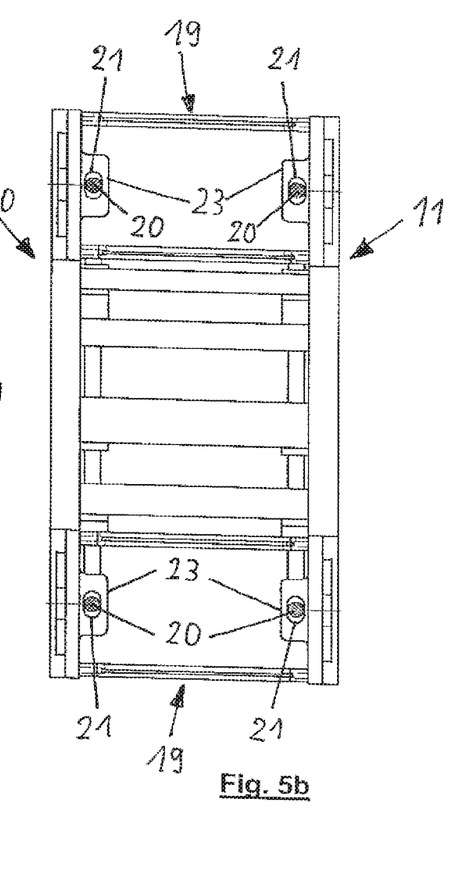
FIG. 5b shows an end view from the runs into the connecting region shown in FIG. 6.

The embodiment shown in FIGS. 5a and 5b differs from the above-described structure in that the elastic bars 20 which are arcuate in the unstressed state are arranged at the inward sides of the side portions 10 and 11. The bars 20 are guided through openings 21 in projections 23 facing inwardly on the side portions 10 and 11 and are fixed to a projection 23 of the respective second side portion 10 and 11 adjoining the connecting region 7.

FIGS. 6a-6e show various positions of the line guiding device 1 with respect to the surface 24 of a base 25. This involves a flat surface 24 on which the line guiding device 1 can be slidingly guided. The surface 24 of the base 25 then forms the area of action, over which the connecting member 3 movably connected to the consumer can be moved. In this case the runs 5 and 6 and the connecting region 7 of a loop 4 bear with a side against the surface 24 of the base 25.

In the case of the line guiding device 1 which here is in the form of an energy guiding chain, with box-shaped link members 8 and 9 which have side portions 10 and 11 the members 8 and 9 bear laterally with the side portions 10 against the surface 24 of the base 25 and are guided slidingly on that surface.

Figure 6A:
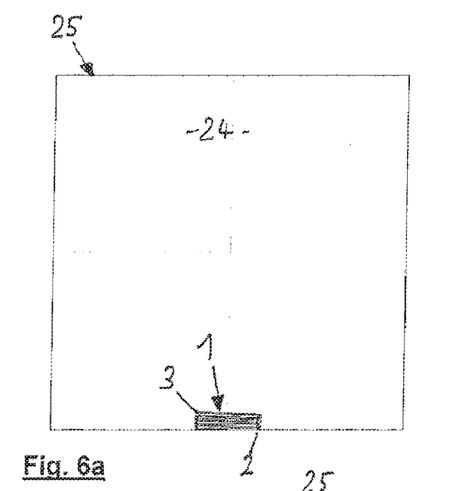
FIG. 6a shows a line guiding device bearing laterally on the surface of a base in the folded-together state (starting point of the movable connecting member)

FIG. 6a shows the line guiding device 1 disposed laterally on the surface 24 in the state shown in FIG. 1. That folded-together (laid-together) state defines the starting point of the movable connecting member 3. The connecting member 2 which can be arranged stationarily is arranged at the edge of the surface 24 fixedly in the position shown in FIG. 6a.

Figure 6B:
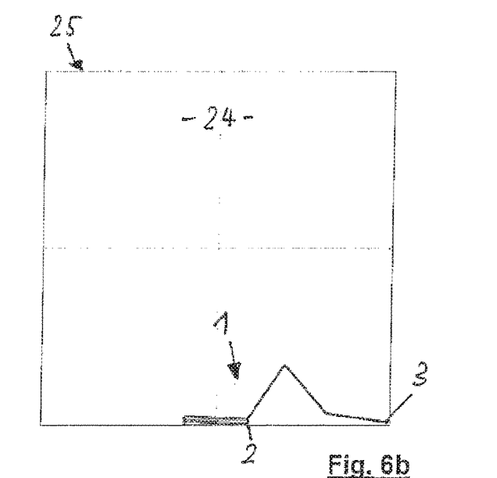
FIG. 6b shows a first partly folded open position of the line guiding device in which the movable connecting member reaches the lower right-hand corner of the surface.

FIG. 6b shows the line guiding device 1 in a partially folded-open state in which the movable connecting member 3 is guided to the bottom right-hand corner of the surface 24. As can be seen from FIG. 6b the runs of the three loops 4 adjoining the movable connecting member 3 are spread open. The means for producing a restoring force from those spread-open positions are not shown in FIGS. 6a-6e for the sake of simplicity.

Figure 6C:
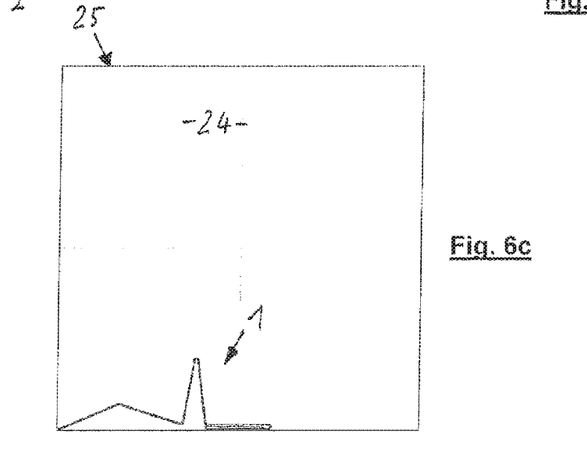
FIG. 6c shows a second partly folded open position of the line guiding device in which the movable connecting member reaches the lower left-hand corner of the surface.

FIG. 6c shows a position of the line guiding device 1 in which the movable connecting member 3 has been moved to the bottom left-hand corner of the surface 24. In this case the last four loops 4 of the line guiding device 1 are spread open.

Figure 6D:
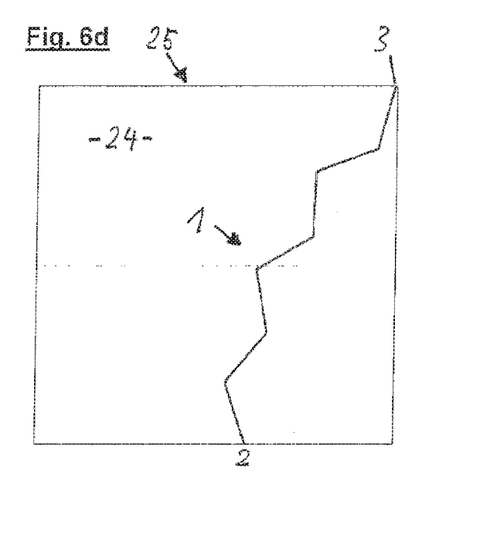
FIG. 6d shows a substantially folded open position of the line guiding device in which the movable connecting member reaches the upper right-hand corner of the surface.
Figure 6E:
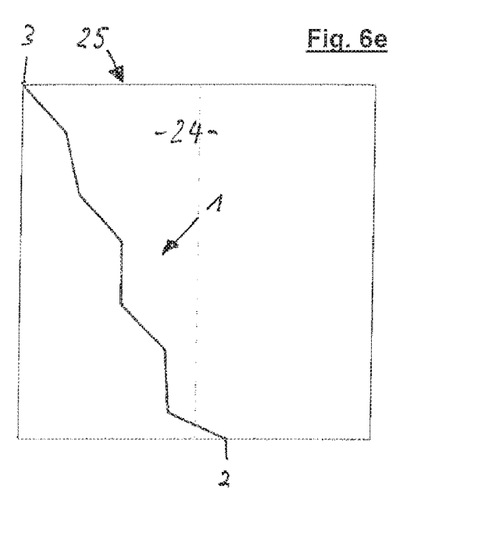
FIG. 6e shows a substantially folded open position of the line guiding device in which the movable connecting member reaches the upper left-hand corner of the surface.

FIGS. 6d and 6e show positions of the line guiding device 1 in which the movable connecting member 3 is moved to the top right-hand corner and top left-hand corner respectively of the surface 24 of the base 25. In those positions all six loops 4 of the line guiding device 1 are spread open.

Figures 7A, 7B:
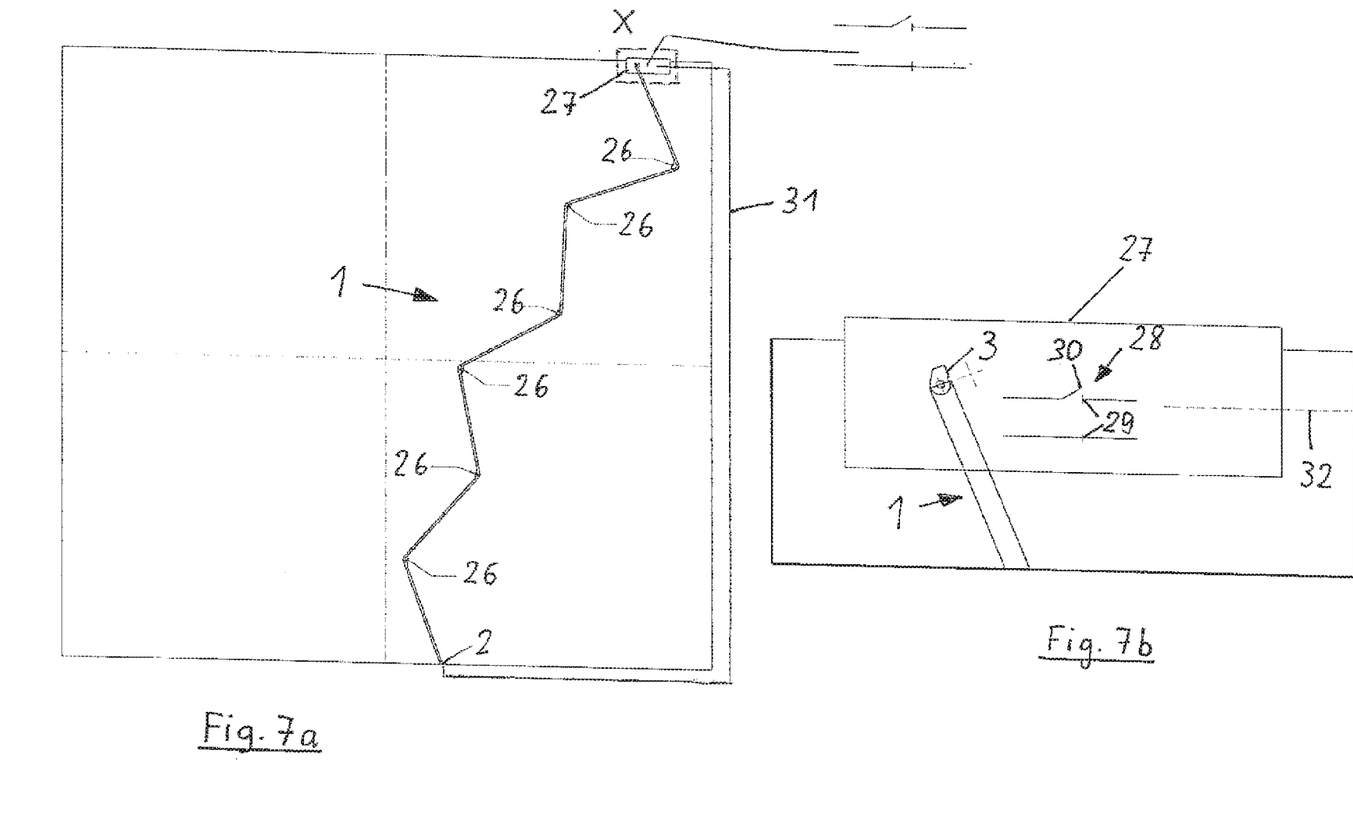

FIG. 7a shows a line guiding device which is guided on the surface of a base 25 in lateral sliding relationship and in which the movable connecting member 3 connected to the consumer (not shown) has again reached an end position at the edge of the surface 24 opposite to the connecting member 2. Upon displacement of the line guiding device 1 into that position no restoring force is produced between the runs of the individual loops. Rather, there are provided restoring actuators 26 which are actuable by a control device 27 and which in the actuated state produce a restoring force for folding the runs 5 and 6 of the loops 4 together. In the embodiment shown in FIG. 7a the control device 27 is arranged stationarily relative to the movable connecting member 3. It has a contact-making means 28 which upon closure of the contacts 29 and 30 actuates the restoring actuators 26 by way of a signal connection 31 (shown diagrammatically in FIG. 7a), extending through the line guiding device 1. FIG. 7b shows an enlarged view of the region X in FIG. 7a, which diagrammatically shows the control device 27 which in the present embodiment is arranged stationarily with respect to the movable connecting member 3 and has contact-making means 28 and the signal output 32.

The actuators can also be of such a design that, besides the folding-together (laying-together) movement of the runs 5 and 6 they also provide for spreading them open (also actuated by the control device).

LIST OF REFERENCES 1 line guiding device
2 connecting member
3 connecting member
4 loop
5 run
6 run
7 connecting region
8 member
9 member
10 side portion
11 side portion
12 transverse limb
13 outer plate
14 inner plate
15 elastic element
16 elastic band
17 holding device
18 tubular portion
19 member
20 bar
21 opening
22 projection
23 projection
24 surface
25 base
26 restoring actuator
27 control device
28 contact-making means
29 contact
30 contact
31 signal connection
32 signal output

What is claimed is:

1. An energy guiding chain for receiving and guiding energy lines between a connecting member which is arrangeable stationarily and a movable connecting member, the members of which chain have two oppositely disposed side portions which are connected together by transverse limbs in at least some of the members,
   wherein adjoining side portions of directly adjacent members have joint connections, and which chain is arrangeable to form at least one loop,
   wherein the loop has a first run which, over the course of the energy guiding chain, is closer to the connecting member which is arrangeable stationarily and a second run which, over the course of the energy guiding chain, is more remote in relation to the connecting member which is arrangeable stationarily, which runs are connected together by an arcuate connecting region,
   wherein the runs and the connecting region have a space which is continuous between the two connecting members for receiving the energy lines and the connecting region is bendable at least in a plane in which the runs are arranged over a spread angle (>0°),
   wherein the connecting region is so designed or there is provided a device which causes a restoring force to be produced in the spread-open state of the runs, in which the connecting region is bent open, the runs being moved back into their folded-together position by the restoring force, and
   wherein the runs of a loop form rigid regions of the energy guiding chain which do not bend in the movement of the movable connecting member and the movement which occurs therewith of the energy guiding chain, or the members of the run of a loop, that is more remote from the connecting member which is arrangeable stationarily, are configured to block a pivotal movement of adjacent members of said run outwardly out of a straight arrangement, that is to say away from the oppositely disposed run of the loop, but permit a pivotal movement of the members inwardly out of the straight position, that is to say towards the oppositely disposed run,
   wherein there is provided at least one elastic band being configured in an exclusively linear configuration and engaging oppositely disposed sides of the runs of a loop which elastically extends exclusively along its linear configuration and exerts a restoring force on the runs upon spreading from an arrangement of the runs which is substantially parallel.

2. The energy guiding chain as set forth in claim 1, wherein the side portions of the members of the run of a loop, that is more remote from the connecting member which is arrangeable stationarily, are so oriented that they block a pivotal movement of adjacent members of said run outwardly out of the straight arrangement while the side portions of the run of the loop, that is more remote from the connecting member which is arrangeable stationarily, are so oriented that they permit a pivotal movement of adjacent members of the run inwardly out of the straight position.

3. The energy guiding chain as set forth in claim 1, wherein there are provided a plurality of loops which adjoin each other in an S-shape and which extend alternately and the runs of which are spreadable open, wherein the end of a first loop, that is opposite to the connecting region, is connected to the connecting member which is arrangeable stationarily, and the end of a n-th (n>1) loop, that is opposite to the connecting region, is connected to the movable connecting member.

4. The energy guiding chain as set forth in claim 1, wherein the spread angle over which the runs of a loop are pivotable open upon displacement of the line guiding device by virtue of the flexible connecting region is limited by limiting means to <180°.

5. The energy guiding chain as set forth in claim 1, and base for sliding guidance of the energy guiding chain, wherein the base has a surface on which the line guiding device is slidingably guided upon movement of the movable connecting member from a starting point with folded-together runs of a loop towards any point which is reachable on the surface with the runs being spread apart and upon movement of the movable connecting member back to the starting point with the runs being folded together.

6. The energy guiding chain and base as set forth in claim 5, wherein the runs and the connecting region of a loop bear substantially with a side against the surface of the base.

7. The energy guiding chain and base as set forth in claim 5, wherein the connecting member which is arrangeable stationarily is arranged at the edge of the surface of the base, in such a way that the movable connecting member can reach a region that is as large as possible of the surface.

8. An energy guiding chain and base as set forth in claim 5, wherein the energy guiding chain has box-shaped members, wherein the members substantially bear laterally with the side portions of one of the two oppositely disposed lines of side portions against the surface of the base and are slidingly guided on said surface.

9. The energy guiding chain as set forth in claim 1, wherein the at least one elastic band engages end regions of the runs of a loop, that adjoin the connecting region.

10. An energy guiding chain for receiving and guiding energy lines between a connecting member which is arrangeable stationarily and a movable connecting member, the members of which chain have two oppositely disposed side portions which are connected together by transverse limbs in at least some of the members,
wherein adjoining side portions of directly adjacent members have joint connections, and which chain is arrangeable to form at least one loop,
wherein the loop has a first run which, over the course of the energy guiding chain, is closer to the connecting member which is arrangeable stationarily and a second run which, over the course of the energy guiding chain, is more remote in relation to the connecting member which is arrangeable stationarily, which runs are connected together by an arcuate connecting region,
wherein the runs and the connecting region have a space which is continuous between the two connecting members for receiving the energy lines and the connecting region is bendable at least in a plane in which the runs are arranged over a spread angle (>0°),
wherein the connecting region is so designed or there is provided a device which causes a restoring force to be produced in the spread-open state of the runs, in which the connecting region is bent open, the runs being moved back into their folded-together position by the restoring force, and
wherein the runs of a loop form rigid regions of the energy guiding chain which do not bend in the movement of the movable connecting member and the movement which occurs therewith of the energy guiding chain, or the members of the run of a loop, that is more remote from the connecting member which is arrangeable stationarily, are configured to block a pivotal movement of adjacent members of said run outwardly out of a straight arrangement, that is to say away from the oppositely disposed run of the loop, but permit a pivotal movement of the members inwardly out of the straight position, that is to say towards the oppositely disposed run,
wherein provided in the region of the connecting region or the runs of a loop is a restoring actuator which is controllable by a control device and by which a restoring force is exertable on the spread-open runs in the actuated state of the actuator.

11. The energy guiding chain as set forth in claim 10, wherein the side portions of the members of the run of a loop, that is more remote from the connecting member which is arrangeable stationarily, are so oriented that they block a pivotal movement of adjacent members of said run outwardly out of the straight arrangement while the side portions of the run of the loop, that is more remote from the connecting member which is arrangeable stationarily, are so oriented that they permit a pivotal movement of adjacent members of the run inwardly out of the straight position.

12. The energy guiding chain as set forth in claim 10, wherein there are provided a plurality of loops which adjoin each other in an S-shape and which extend alternately and the runs of which are spreadable open, wherein the end of a first loop, that is opposite to the connecting region, is connected to the connecting member which is arrangeable stationarily, and the end of a n-th (n>1) loop, that is opposite to the connecting region, is connected to the movable connecting member.

13. The energy guiding chain as set forth in claim 10, wherein the spread angle over which the runs of a loop are pivotable open upon displacement of the line guiding device by virtue of the flexible connecting region is limited by limiting means to <180°.

14. The energy guiding chain as set forth in claim 10, and base for sliding guidance of the energy guiding chain, wherein the base has a surface on which the line guiding device is slidingably guided upon movement of the movable connecting member from a starting point with folded-together runs of a loop towards any point which is reachable on the surface with the runs being spread apart and upon movement of the movable connecting member back to the starting point with the runs being folded together.

15. The energy guiding chain and base as set forth in claim 14, wherein the runs and the connecting region of a loop bear substantially with a side against the surface of the base.

16. The energy guiding chain and base as set forth in claim 14, wherein the connecting member which is arrangeable stationarily is arranged at the edge of the surface of the base, in such a way that the movable connecting member can reach a region that is as large as possible of the surface.

17. An energy guiding chain and base as set forth in claim 14, wherein the energy guiding chain has box-shaped members, wherein the members substantially bear laterally with the side portions of one of the two oppositely disposed lines of side portions against the surface of the base and are slidingly guided on said surface.

* * * * *